United States Patent [19]

Collyear et al.

[11] Patent Number: 4,535,682
[45] Date of Patent: Aug. 20, 1985

[54] PISTONS

[75] Inventors: John G. Collyear; David A. Parker, both of Rugby, England

[73] Assignee: AE PLC, Rugby, England

[21] Appl. No.: 406,099

[22] Filed: Aug. 6, 1982

Related U.S. Application Data

[63] Continuation-in-part of Ser. No. 305,990, Sep. 28, 1981, abandoned.

[30] Foreign Application Priority Data

Aug. 11, 1981 [GB] United Kingdom ............... 8124473

[51] Int. Cl.³ ............................................... F16J 9/20
[52] U.S. Cl. ....................................... 92/153; 92/158; 92/239; 123/193 P
[58] Field of Search ............... 92/239, 208, 153, 158, 92/DIG. 1; 123/193 P

[56] References Cited

U.S. PATENT DOCUMENTS

| | | | |
|---|---|---|---|
| 1,513,946 | 11/1924 | Vincent | 92/158 |
| 2,271,024 | 1/1942 | Nicolle et al. | 92/158 |
| 3,115,070 | 12/1963 | Tsang | |
| 3,505,934 | 4/1970 | De Biasse | |
| 3,721,163 | 3/1973 | Hill et al. | |
| 4,178,899 | 12/1979 | Vulich | 123/193 P |

FOREIGN PATENT DOCUMENTS

| | | |
|---|---|---|
| 2446870 | 1/1974 | Fed. Rep. of Germany . |
| 420100 | 1/1911 | France . |
| 15585 | 3/1912 | France . |
| WO80/00738 | 4/1980 | PCT Int'l Appl. . |
| 179188 | 11/1935 | Switzerland . |
| 229255 | 6/1942 | Switzerland . |
| 199570 | 6/1923 | United Kingdom . |
| 200947 | 7/1923 | United Kingdom ............... 92/239 |
| 364787 | 1/1932 | United Kingdom . |
| 398293 | 9/1933 | United Kingdom . |
| 967767 | 8/1964 | United Kingdom . |
| 1588076 | 2/1978 | United Kingdom . |
| 1504019 | 3/1978 | United Kingdom . |
| 2050563A | 11/1979 | United Kingdom . |

OTHER PUBLICATIONS

Article from "Kraftfahrzeugtechnik", 12/76, pp. 364-367, entitled Review of Investigations into Friction Losses in Internal Combustion Engines, by Dr. Ing. D. Gerner.

Primary Examiner—Robert E. Garrett
Assistant Examiner—John M. Husar
Attorney, Agent, or Firm—Leydig, Voit, Osann, Mayer & Hold, Ltd.

[57] ABSTRACT

A piston for an engine or motor has a skirt which includes two portions which are urged towards an associated cylinder during the various strokes of the working cycle. Each portion is provided with a bearing surface or surfaces for sliding engagement with the associated cylinder during reciprocation. The piston is provided with formations which pass lubricant to and over the bearing surfaces.

47 Claims, 9 Drawing Figures

PISTONS

This application is a continuation-in-part of U.S. patent application Ser. No. 305,990, filed Sept. 28, 1981, now abandoned.

BACKGROUND TO THE INVENTION

1. Field of the Invention

This invention relates to pistons for use in reciprocating combustion engines or reciprocating compressors or in hydraulic or pneumatic reciprocating motors and in particular to the reduction of friction between a co-operating cylinder wall or liner and the skirt of the piston and the reduction of the viscous oil losses in an oil film between these two co-operating surfaces.

2. Discussion of the Prior Art

The following is a more detailed description of a known standard piston, with reference to FIG. 1 of the accompanying drawings which is a side elevation of a known standard piston.

The known piston 11 has a ring belt 40, a crown 15, a skirt 12 and a gudgeon pin hole 13 extending through the piston normal to the piston axis. The skirt 12 is continuous and is usually slightly oval in cross-section. The skirt 12 of the piston performs no gas sealing function. Gas and oil sealing are provided by piston rings fitted into circumferential grooves in the crown of the piston.

In use, a connecting rod (not shown) is pivotally connected to the piston 11 by a gudgeon pin (not shown) extending through the hole 13. Since the connecting rod does not, in general, act along the piston axis, there is a varying lateral thrust force acting on the piston 11 which urges either a major or minor thrust portion of the skirt towards the associated cylinder during the working cycle. These thrust portions are on opposite sides of a plane including the axis of the gudgeon pin bore and the piston axis.

The whole circumferential extent of the skirt is thus not in contact with the associated cylinder or liner during reciprocation but only those thrust portions of the skirt which lie about the intersection of the skirt with a thrust plane including the piston axis and normal to the axis of the gudgeon pin hole. Since the lateral thrust force varies during reciprocation, the part of these thrust portions in contact with the cylinder or liner at any instant will also vary with time. In general, however, the part of a piston in instantaneous contact with the cylinder or liner will be within an area 14 commonly known as the bedding or contact area which is thus the envelope of all the instantaneous areas of contact. This bedding area may be larger on the major thrust portion of the piston, which contacts the cylinder or liner with the greater force during the expansion stroke, than on the opposite minor thrust portion which contacts the cylinder or liner with the greater force during the compression stroke.

The precise shape of the contact area will vary from piston to piston although it has been found that in general the contact area does not extend more than 30° in either side of the intersection of the thrust plane with the skirt. It has also been found that for a piston having a nominal diameter D and a skirt length of $\pi 2D/3$, the contact area is approximately $\pi D^2/9$. Such a piston is hereinafter referred to as a 'standard piston' and such a contact area as 'a standard contact area'.

The sliding contact between the skirt and the cylinder or liner is lubricated by an oil film. The frictional force (F) between the piston and the cylinder or liner as a result of this contact is given by the following relationship:

$$F \alpha \sqrt{W \eta\, U A}$$

where
W = load
$\eta$ = lubricant viscosity
U = sliding velocity
A = contact area Contact between the thrust portions of the skirt and the associated cylinder or liner causes a high proportion of the friction losses, for example, 20% of the total engine friction losses (corresponding to about 8% of the mechanical output), which in turn reduces fuel economy. Thus a reduction in friction of, say, 25% between the skirt and the cylinder or cylinder wall can provide an additional mechanical output of about 2%, thereby in this example reducing the fuel required for a given duty by just under 2%.

This relationship implies that for a given load, viscosity and velocity, the frictional force can be reduced by reducing the area of contact. This is clearly desirable since, as mentioned above, some of the engine power is consumed in overcoming this friction.

However, a reduction in contact area also reduces the thickness of the oil film between the skirt and the cylinder or liner. Only a limited reduction in this thickness can be tolerated because when the thickness of the oil film is less than the height of asperities on the surface of the skirt and the cylinder or liner there will be metal-to-metal contact and the frictional forces will rapidly rise.

SUMMARY OF THE INVENTION

Thus, an object of the invention is to reduce viscous losses caused by a piston in operation while retaining an adequate oil film.

According to a first aspect of the invention, there is provided a piston for an engine or motor and comprising a crown, a gudgeon pin bore, and, to each side of a plane including the piston axis and the gudgeon pin axis, a discrete bearing surface or surfaces which transmit lateral thrust to an associated cylinder or liner during reciprocation of the piston in one respective direction, at least one of said surfaces being provided with a formation at least partially therearound for passing lubricant to and over the associated bearing surface during at least part of said piston reciprocation.

Preferably, said formation comprises a ramp extending up to a peripheral edge of said at least one bearing surface, the ramp being such as to provide, with the associated cylinder or liner, a passage of decreasing cross-section up to said bearing surface so as to direct lubricant onto said surface during at least a part of the reciprocation of the piston.

Additionally or alternatively, said formation may comprise a skirt portion on which said at least one bearing surface is formed, which surrounds said at least one bearing surface and which is so spaced radially inwardly of said bearing surface as to provide a reservoir of lubricant for passage to said bearing surface.

According to a second aspect of the invention, there is provided a piston for an engine or motor and comprising a crown, a gudgeon pin bore and a skirt having two opposed thrust portions which are urged towards an associated cylinder or liner during respective directions of reciprocation of the piston, each thrust portion being provided with two or more discrete bearing surfaces which are spaced radially outwardly of the associated skirt thrust portion by less than 125 microns and which are for sliding engagement with an associated cylinder or liner, each bearing surface being connected to the surrounding skirt by ramps, whereby, during reciprocation of the piston, lubricant is passed to and over each surface from the surrounding skirt.

BRIEF DESCRIPTION OF THE DRAWINGS

The following is a more detailed description of some embodiments of the invention, by way of example, reference being made to the accompanying drawings, in which.

DESCRIPTION OF THE PREFERRED EMBODIMENTS

Figure 1:
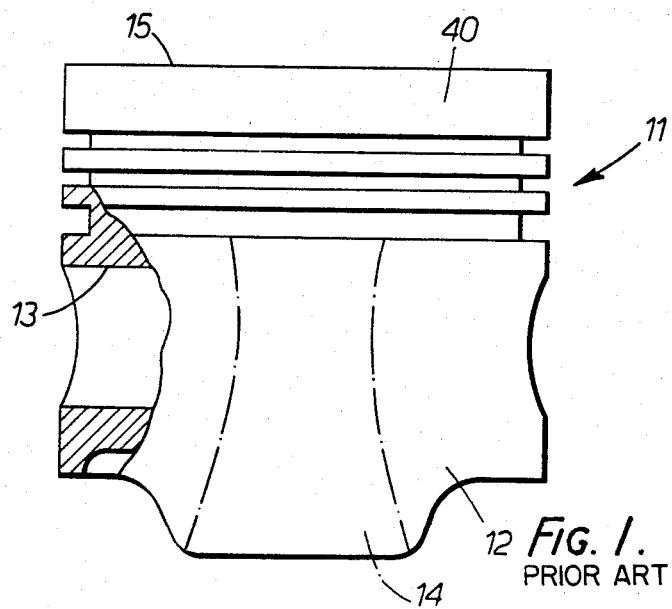

In the embodiments of the invention now to be described, parts common to FIG. 1 and FIGS. 2, 3, 4, 5, 7 8 and 9 will be given the same reference numerals and will not be described in detail.

Figure 2:
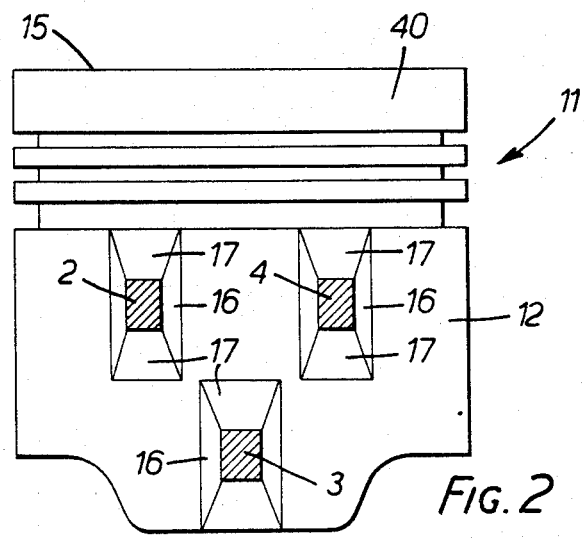
FIG. 2 is a side elevation of a first form of piston for a combustion engine or motor.

Referring first to FIG. 2, the first piston has six discrete raised bearing surfaces on the skirt 12 for sliding contact with an associated cylinder or liner. The bearing surfaces are arranged in similar groups of three on either side of a plane containing the piston axis and the gudgeon pin axis. FIG. 2 shows one group of bearing surfaces 2, 3 and 4 and it will be understood that the other group are similarly arranged. Two bearing surfaces 2 and 4 are circumferentially aligned with one another, are nearer to the crown 5 of the piston and are equidistantly spaced on opposite sides of the intersection of the skirt 12 with a plane including the piston axis and normal to the axis of the gudgeon pin hole. The other bearing surface 3 is nearer to the lower end of the piston skirt and is symmetrically disposed about said intersection so that this lower surface 3 lies opposite the space between the crown end surfaces 2 and 4. Each surface 2, 3, 4 is of the same rectangular shape with two circumferentially extending edges and two axially extending edges. The outer axial edges of the two crown end bearing surfaces 2, 4 are each angularly spaced by 30° from said intersection so that they lie within the contact area of a standard piston of similar dimensions. The lower bearing surface 3 extends 5° on either side of the intersection and thus also lies within this area.

As shown in FIG. 2 there are ramps 16 each extending over 5° of the skirt circumference and leading up to the axially extending edges of each bearing surface, 2, 3, 4, and longer ramps 17 leading up to the circumferential edges of each bearing surface 2, 3, 4. The length of the ramps 17 may be 8 mm to give a slope, relative to a notional cylindrical surface co-axial with the piston axis, of between 0.2° and 1°. Thus, each bearing surface, including the slopes, has a substantially trapezoidal cross-section. The surface of each bearing surface is curved and is spaced 25 microns radially outwardly of the rest of the skirt thrust portions 14 although this distance may be less or, for example, up to 125 microns.

In the embodiment of FIG. 2, there are, in the two skirt thrust portions 14 together, a total of four bearing surfaces towards the crown end of the piston 11 and two bearing surfaces towards the lower end of the skirt. The contact area of the bearing surfaces 2, 3, 4 on each skirt thrust portion is 8% of the contact area of a standard piston of similar dimensions. The bearing surfaces may be arcuate in shape but not necessarily so, and part elliptical surfaces may be appropriate. If the bearing surfaces are arcuate they need not have the same centre as the piston, assuming it to be cylindrical. The lines of intersection of the bearing surfaces and planes including the piston axis may be straight or curved.

There may, as described above, be an equal number of bearing surfaces formed on both thrust portions of the piston or the bearing surfaces may be arranged so that there are more or a greater bearing surface area on one thrust portion than on the other. For example, there may be more bearing surfaces or a greater bearing surface area on the skirt major thrust portion than on the skirt minor thrust portion.

In use, the piston 11 is mounted on a connecting rod in the cylinder or liner of an engine and reciprocates. The bearing surfaces contact the cylinder or liner to transmit the thrust from the connecting rod to the engine block and to guide the piston in its reciprocation. The bearing surfaces 2, 3, 4 are within the contact area of a standard piston of corresponding dimensions and so they react to the lateral thrust on the piston. Since the two crown end bearing surfaces 2, 4 are circumferentially spaced rather than at the centre of the skirt thrust portion, they reduce the tendency of the skirt to distort under the influence of the thrust forces. The lower bearing surface 3 is smaller in area than the combined area of the crown end bearing surfaces 2, 4 because the forces acting on the lower part of the skirt are less than the forces on the crown end of the skirt. Thus the thrust forces are satisfactorily transmitted.

Figure 3:
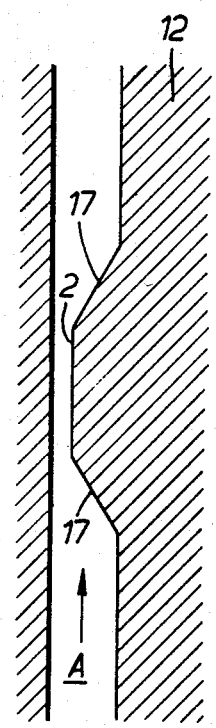
FIG. 3 is a schematic cross-section through a bearing surface of the piston of FIG. 2 in a plane including the piston axis.

In addition, adequate hydrodynamic lubrication of the bearing surfaces 2, 3, 4 is encouraged by the ramp and skirt formations provided around the bearing surfaces as best seen in FIG. 3, in which the direction of reciprocation of the piston is indicated by the arrow A. The ramps leading to the circumferential edges of the bearing surfaces maintain a satisfactory oil film on the bearing surfaces 2, 3, 4 despite the tendency of the reduced area of contact otherwise to reduce the thickness of the oil film below a workable minimum. The shallow slope of the ramps, not exceeding 1°, forms, with the associated cylinder or liner, a gradually narrowing passage for oil which is dynamically guided onto the bearing surfaces 2, 3, 4. The oil flows over the bearing surfaces before returning to the space between the cylinder or liner and the remainder of the skirt portion surrounding the bearing surfaces.

The radial spacing of the bearing surfaces from the skirt thrust portions (preferably between 125 microns and 25 microns) is sufficiently small to allow oil to be retained in these regions during the reciprocation of the piston and to give momentary oil pressurization during incidences of piston slope which, it is believed, may provide forced lubrication of the bearing surfaces. In addition, the gap between the crown end bearing surfaces 2, 4 allows oil to reach the lower bearing surface 3 during a compression stroke so that the lower bearing surface 3 receives adequate oil during this stroke. An opposite effect occurs during the expansion stroke when oil is not prevented from reaching the crown end surfaces 2, 4.

Thus a reduction in contact area is achieved with a corresponding reduction in the frictional forces but without a detrimental reduction in thickness of the lubricating film.

When a piston is mounted in an engine or motor, it is attached to a connecting rod by a gudgeon pin. Because the piston is not an exact fit in the associated cylinder or liner, it can pivot about the gudgeon pin and thus alter the orientation of the ramps and bearing surfaces relatively to the cylinder or liner. In addition, the piston and the associated cylinder or liner will also expand as the engine or motor starts from and reaches operating temperatures. This will also alter the orientation of the ramps and bearing surfaces relatively to the associated cylinder or liner.

Such alterations will alter the dimensions of the passage formed between the ramps and the cylinder or liner and may affect adversely the lubrication of the associated bearing surface. In an attempt to overcome such possible problems, the cross-section of the bearing surfaces may be altered to the shapes shown in FIGS. 4 or 5.

Figure 4:
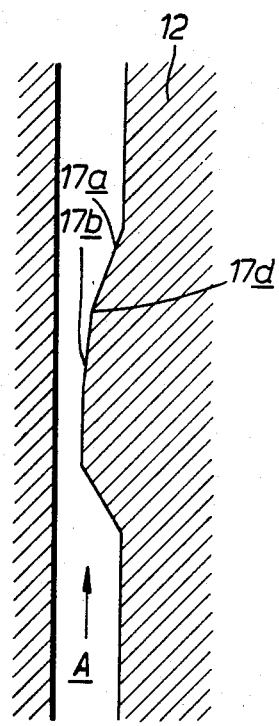
FIG. 4 is a similar view to FIG. 3 but showing a first alternative form of bearing surface.

In FIG. 4, the ramp leading up to one circumferential edge of each bearing surface is formed of two mutually inclined sections 17a, 17b. The first section 17a provides a passage for hydrodynamic lubrication for one relative orientation of the ramp and the cylinder or liner while the second section 17b provides such a passage when there is an alternative orientation.

Figure 5:
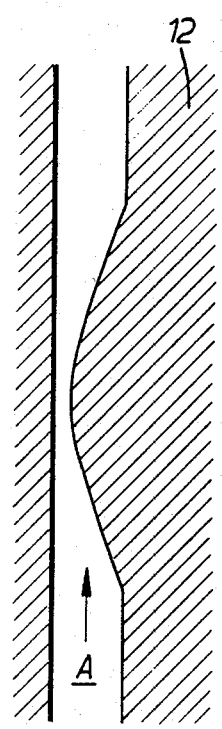
FIG. 5 is a similar view to FIG. 4 but showing a second alternative form of bearing surface.

In FIG. 5, the number of change points is infinite with the ramp 17 being convexly curved. This allows a hydrodynamic lubrication to be achieved under all conditions. In this embodiment, the bearing surface is also curved. Since a bearing surface of the kind shown in FIG. 3 will eventually wear to the shape of the surface in FIG. 5, the shape of FIG. 5 anticipates this wear.

The arrangement of the bearing surfaces themselves in FIG. 2, their relation to one another and their relation to the surrounding skirt thrust portion can produce improvements in engine performance. For example, four pistons 11 fitted in an engine of 1275 cm³ have given the following improvements in comparison with the use of standard pistons of the same dimensions:

Power—No significant improvement
Fuel consumption—Reduction by up to 3.5% improvement at full load
Friction—Reduction by about 1% at 2,500 r.p.m., road load.

Figure 6:
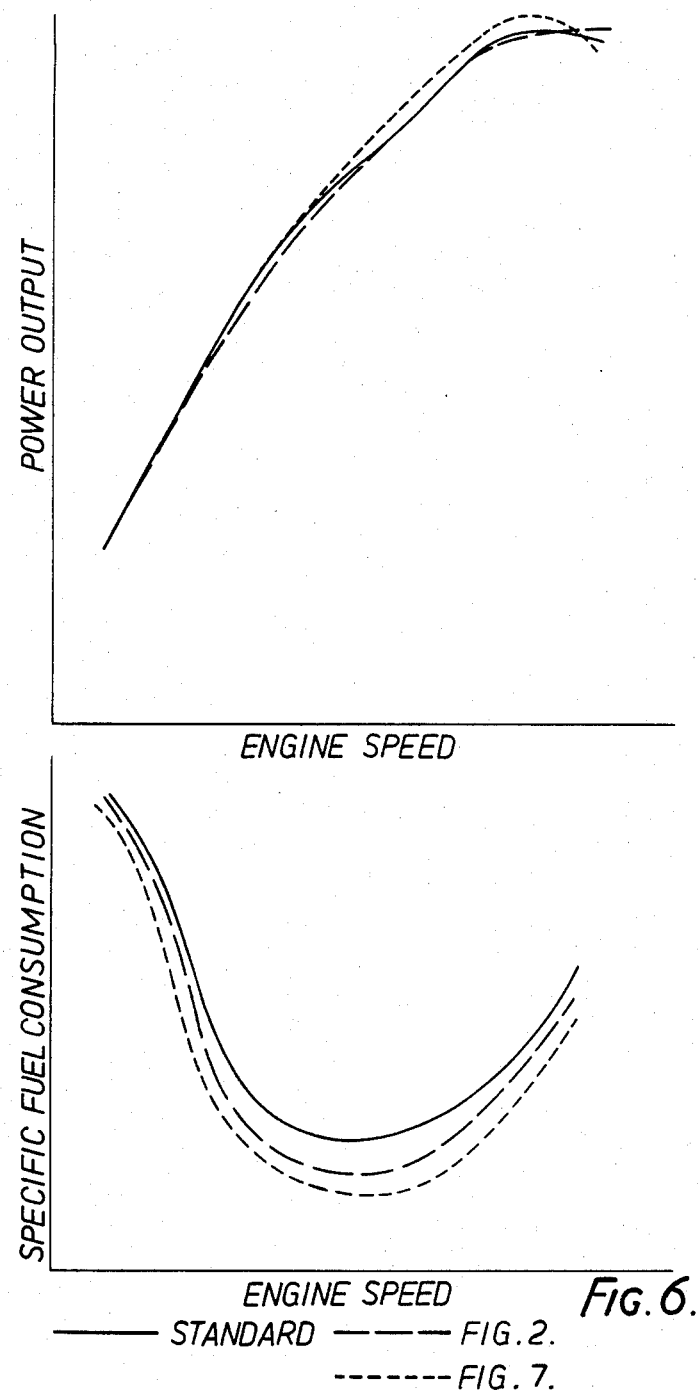
FIG. 6 shows graphically the variation of power output and specific fuel consumption with engine speed for an engine fitted with pistons as shown in FIG. 2 (broken lines) and FIG. 7 (chain dotted line) in comparison with a standard piston (continuous line)

These results are shown graphically in FIG. 6 with the results for the standard piston being shown in continuous line and the results for the piston of FIG. 2 being shown in broken line.

Figure 7:
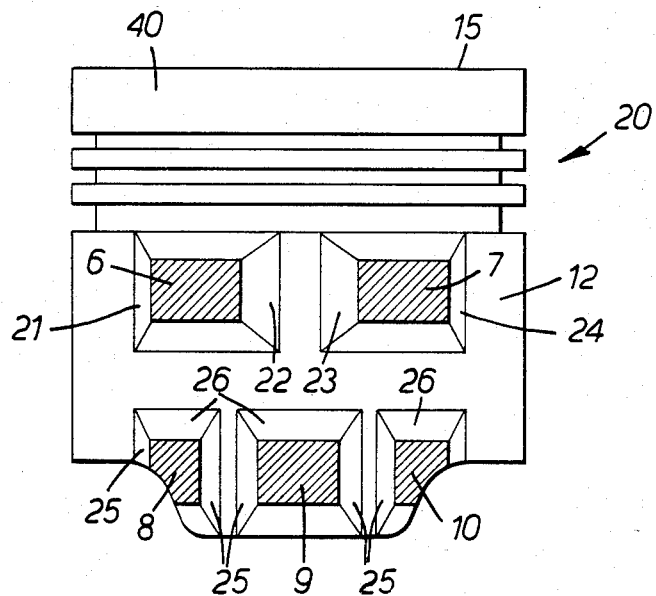
FIG. 7 is a side elevation of a second form of piston for a combustion engine or a motor.

Referring next to FIG. 7, the second piston 20 shown therein is, in general, similar to the piston 11 described above with reference to FIG. 1. In the piston of FIG. 3 there are two crown end bearing surfaces 6, 7 on each skirt portion equally spaced on opposite sides of the intersection of the skirt with a plane including the piston axis and normal to the axis of the gudgeon pin hole 13. In addition, there are three lower bearing surfaces 8, 9, 10 on each skirt thrust portion with the central surface 9 symmetrical about said intersection and the outer surfaces 8, 10 equally spaced on opposite sides of said intersection. The bearing surfaces are all rectangular in shape with their longer dimension extending circumferentially. The outer axial edges of the upper pair of bearing surfaces 6 and 7 are each angularly spaced by 40° from said intersection so that they lie mostly within the contact area of a standard piston of similar dimensions. There are two ramps 21 and 24 each extending over 5° of the skirt circumference and leading up to the outer axially extending edges of the bearing surfaces 6 and 7, and two ramps 22 and 23 each extending over 10° of the skirt circumference and leading up to the inner axially extending edges of the bearing surfaces 6 and 7. The bearing surfaces 6, 7 each have an arcuate length of 25°.

The lower bearing surfaces have symmetrical ramps 25 which extend on either side of the bearing surfaces over 5° of the skirt circumference. The centre bearing surface 9 is of greater arcuate length than the other two 8 and 10 so that it extends circumferentially over most of the gap between the crown end bearing surfaces 6, 7. The outer axial edges of the bearing surfaces 8 and 10 are each angularly spaced by 40° from the said intersection. The lower corners of the two outer lower bearing surfaces 8, 10 are removed because of the shape of the skirt in the example shown, but would not be removed in the other examples.

The circumferential extent of the upper set of bearing surfaces need not however be the same as the circumferential extent of the lower set of bearing surfaces. As with the piston of FIG. 2, the number, arrangement or area of the bearing surfaces on the skirt major thrust portion may be different from those of the bearing surfaces on the skirt minor thrust portion. In general, however, the majority of the area of the bearing surfaces lies within the contact area of a standard piston of similar dimensions.

As seen in FIG. 7, ramps 26 lead up to the circumferential edges of each of the bearing surfaces 6, 7, 8, 9, 10. The axial length of the ramps 26 may be approximately 5 mm to give a slope relative to the remainder of the skirt of between 0.3° and 1.5°.

The contact area of the thrust surfaces 6, 7, 8, 9, 10 on each skirt portion 14 is 25% of the contact area of a standard piston of similar dimensions. The spacing of the bearing surfaces radially outwardly on the associated skirt portion 14 is 25 microns, although this may be less or, for example, up to 125 microns.

The piston of FIG. 7 operates in generally the same way as the piston of FIG. 2 with the same load transmitting and the same hydrodynamic lubrication characteristics provided by the formations around the bearing surfaces. The fact that the bearing surfaces 6, 7, 8, 9, 10 are longer circumferentially than axially improves the lubrication, since most of the oil forced up to a circumferential edge of a bearing surface from a ramp 26 spreads over the surface and tends to leave the surface over the trailing circumferential edge. Where the axial dimension of the surface is longer than the circumferential dimension, much of the oil has left the surface circumferentially before it reaches the trailing edge, and so parts of the surface can be inadequately lubricated. In the piston of FIG. 2, however, the axial length is sufficiently short to ensure that only a relatively small proportion of the oil leaves the sides so that sufficient oil reaches the trailing edges of the surfaces. In addition, the positioning of the central lower bearing surface of the piston of FIG. 7 between the crown end bearing surfaces ensures that contact with the cylinder or liner occurs over the whole circumferential extent of the skirt thrust portion 14.

This piston thus also features a reduction in the contact area with the consequent reduction in frictional forces, while maintaining adequate lubrication of the contact surfaces is maintained.

This arrangement of the bearing surfaces themselves, their relation to one another and their relation to the surrounding skirt thrust portion can produce improvements in engine performance. For example, four pistons of the kind shown in FIG. 7 fitted in an engine of 1275 cm$^2$ have given the following improvements in comparison with the use of standard pistons of the same general dimensions:

Power—up to 3.6% improvement
Fuel Consumption—up to 5% improvement at full load
Friction—Reduction by about 3% at 2500 r.p.m., road load.

These results are shown graphically in FIG. 6 (in chain dotted line) in comparison with a standard piston (in continuous line).

Figure 8:
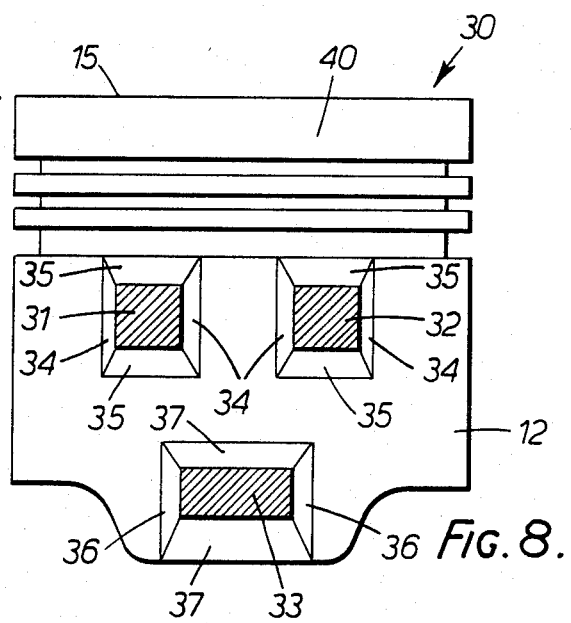
FIG. 8 is a side elevation of a third form of piston for a combustion engine or a motor.

Referring next to FIG. 8, the third piston 30 is, in general, similar to the piston of FIG. 1. Three bearing surfaces 31,32,33 are provided on each side of the piston, two bearing surfaces 31, 32 near the crown end of the skirt and one lower bearing surface 33 near the lower end of the skirt. The two crown end bearing surfaces 31, 32 are rectangular with their longer dimension extending circumferentially. Each of these bearing surfaces has a circumferential length of 20° and extends to 35° from the intersection of the skirt with a plane including the piston axis and normal to the axis of the gudgeon pin hole 13. The axial edges have ramps 34 leading up to them whose circumferential length is 10°. There are also ramps 35 leading to the circumferential edges whose axial length may be 4 mm, to give a slope relative to the remainder of the skirt of between 0.4° and 1.5°.

The lower bearing surface 33 is also rectangular with its greater dimension in the circumferential direction. This surface is positioned so that its circumferential length is equal to the circumferential gap between the crown end bearing surfaces 31, 32. The area of the surface 33 is greater than the area of either of the crown end surfaces 31, 32, but is less than their combined area. For example, the bearing surface 33 may be 0.75× the combined crown end bearing surface areas. This lower bearing surface 33 is provided with ramps 36 which lead to its axial edges and which extend circumferentially for 10° and ramps 37 leading to its circumferential edges. The axial length of the upper ramp 37 may be 4 mm to give a slope relative to the remainder of the skirt of between 0.4° and 1.5°. The lower ramp 37 may extend to the lower edge of the skirt with a slope lower than that of the upper ramp 37. The contact area of the three thrust surfaces may be D$^2$/11.5 where D is the nominal diameter of the piston. Thus the contact area is only 25% of the contact area of a standard piston of similar dimensions. In addition, the bearing surfaces are spaced radially outwardly of the skirt thrust portion by no more than 125 microns and no less than 25 microns. The skirt may be further reduced in diameter beyond the axial edges of the crown end bearing surfaces 31, 32 to prevent side contact of the piston with the cylinder or liner for any reason, including piston tilt.

The piston of FIG. 8 operates in generally the same way as the pistons of FIGS. 2 and 7 with similar load bearing and hydrodynamic lubrication characteristics. The circumferentially elongate shape of the bearing surfaces and the shape of the ramps ensures satisfactory lubrication and the overlap between the lower bearing surface 33 and the crown end bearing surfaces ensures that contact with the cylinder or liner occurs over the whole circumferential extend of the skirt thrust portion 14.

This piston thus also features a reduction in the contact area with the consequent reduction in frictional forces, while adequate lubrication of the contact surfaces is maintained.

This arrangement of the bearing surfaces themselves, their relation to one another and their relation to the surrounding skirt thrust portion can produce improvements in engine performance similar to those produced by the piston in FIG. 7.

Figure 9:
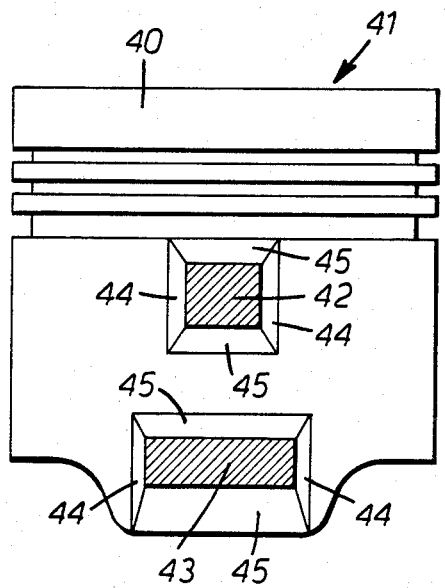
FIG. 9 is a side elevation of a fourth form of piston for a combustion engine or a motor.

Referring next to FIG. 9, the fourth piston 41 includes only two bearing surfaces 42, 43 on each side of the piston. The two bearing surfaces 42, 43 are axially spaced and are both symetrically spaced around the intersection with the skirt of a plane including the piston axis and normal to the axis of the gudgeon pin hole 13. Both bearing surfaces 42, 43 are rectangular in shape with the longer edges extending circumferentially. The crown end bearing surface 42 is of smaller area than the lower bearing surface 43 with a circumferential extent of 20° compared to a circumferential extent of 40° for the lower bearing surface 43. These surfaces thus lie within the contact area of a standard piston of similar dimensions.

Both bearing surfaces 42, 43 are provided with ramps 44, leading up to their axial edges, whose angular extent is 10°. Ramps 45 are also provided, leading up to the circumferential edges of the crown end bearing surface 42 and the upper circumferential edge of the lower bearing surface 43, whose slope relative to the remainder of the skirt is between 0.4° and 1.5°. A ramp 45 leading up to the lower circumferential edge of the lower bearing surface 43 may extend to the lower edge of the skirt with a slope lower than that of the other ramps 45.

The bearing surfaces 42, 43 are spaced radially outwardly of the surrounding skirt 15 by no more than 125 microns and no less than 25 microns. The contact area of the bearing surfaces 42, 43 is about 18% of the contact area of a standard piston of similar dimensions.

The piston of FIG. 9 operates in generally the same way as the pistons of FIGS. 2, 7 and 8 with similar load bearing and hydrodynamic lubrication characteristics. The depth of the spacing of the bearing surfaces 42, 43 from the surrounding skirt 15, the circumferentially elongate shape of the bearing surfaces and the shallow angle of the ramps all ensure that the bearing surfaces are satisfactorily lubricated. The reduced area of the bearing surfaces 42, 43 reduces the piston frictional forces and thus makes possible an increase in power output and a decrease in fuel consumption.

It will be appreciated from the above exemplary embodiments with reference to the drawings that the bearing surfaces may be arranged on the skirt thrust portions in any suitable way. A large number of smaller bearing surfaces may be used instead of a small number of larger bearing surfaces. The number and/or arrangement and/or area of the bearing surfaces may be different on the skirt major and minor thrust portions. In addition, the face of each bearing surface may be of any convenient shape whether curved or otherwise. The area of the bearing surfaces may vary between 0.05 and 0.95 $D^2/9$, where D is the nominal diameter of the piston. For example, there may be a lesser number of bearing surfaces at the crown end and a greater number at the lower end. In addition, there may be a bearing surface or surfaces in the region of the ring belt 40.

It will be appreciated that ramps of shallow angle and spacing of a bearing surface from the surrounding skirt by less than 125 microns may be applied to any discrete bearing surface that is spaced radially outwardly of a surrounding skirt to encourage hydrodynamic lubrication of the bearing surface. It will also be appreciated that those portions of the surrounding skirt which are remote from the bearing surfaces may be removed to reduce the weight of the piston.

We claim:

1. A piston for reciprocation in a cylinder of an internal combustion engine wherein lubrication with an associated cylinder is provided by an oil film, comprising
    a crown,
    a gudgeon pin bore,
    a ring belt,
    a first generally cylindrical skirt portion to one side of a plane including the piston axis and the gudgeon pin bore axis,
    a second generally cylindrical skirt portion to the other side of said plane,
    said skirt portions being attached to the ring belt,
    a small number of discrete bearing surfaces formed on the first and second skirt portions,
    each of said skirt portions having an associated one of said skirt portions therearound and being spaced radially outwardly of the associated one of said skirt portions by a small distance,
    a circumferentially extending front edge to each bearing surface,
    a circumferentially extending rear edge to each bearing surface,
    generally axially extending side edges interconnecting the front and rear edges of each bearing surface,
    a shallow hydrodynamic ramp connecting each said circumferential front edge to the surrounding skirt portion, the end of said ramp remote from the associated bearing surface being spaced from the surface in a radial direction by less than 125 microns.
    a shallow hydrodynamic ramp connecting each said circumferential rear edge to the surrounding skirt portion, the end of said ramp remote from the associated bearing surface being spaced from the surface in a radial direction by less than 125 microns,
    the surrounding skirt portions providing retained oil said small distance from said bearing surfaces and said ramps co-operating with the cylinder to force a thin oil film over the bearing surfaces during motion of the piston relative to the cylinder to hydrodynamically lubricate said bearing surfaces as the bearing surfaces transmit lateral thrust from the piston to the co-operating cylinder.

2. A piston according to claim 1, wherein the lines of intersection between the surface of each ramp and planes including the piston axis are straight.

3. A piston according to claim 1 wherein the lines of intersection between the surface of each ramp and planes including the piston axis are curved.

4. A piston according to claim 1, wherein the angle of each ramp relative to a notional cylindrical surface coaxial with the piston axis is less than 1.5 degrees.

5. A piston according to claim 1, wherein generally cylindrical skirt portion is spaced radially inwardly of said bearing surfaces by less than 125 microns.

6. A piston according to claim 1, wherein each said bearing surface is generally rectangular in shape.

7. A piston according to claim 6 wherein the relation of the axial extent of said rectangular bearing surface to the circumferential length of said bearing surface is such as to ensure that at least some of the lubricant leaves said bearing surface over the edge thereof which is the trailing edge during reciprocation of the piston in one direction.

8. A piston according to claim 7 wherein the length of the bearing surface in an axial direction is less than the width of the surface in a circumferential direction.

9. A piston according to claim 1, wherein there are, on each generally cylindrical skirt portion at least three bearing surfaces for transmitting lateral thrust during reciprocation of the piston in one direction, two of said bearing surfaces being towards the crown end of the piston and the remaining surface or surfaces being towards the lower end of the piston.

10. A piston according to claim 9 wherein the two crown end bearing surfaces have a greater surface area than the remaining bearing surface or bearing surfaces.

11. A piston according to claim 9 wherein the crown end bearing surfaces are equidistantly spaced on either side of a plane including the piston axis and normal to the gudgeon pin bore axis and wherein a reemaining bearing surface is symmetrically disposed about said plane.

12. A piston according to claim 11, wherein the spacing between the crown end bearing surfaces is at least as great as the circumferential length of that remaining bearing surface which is symmetrically disposed about said plane.

13. A piston according to claim 1, wherein each rectangular bearing surface has a ramp extending up to each axially extending edge thereof.

14. A piston according to claim 13 wherein each of said ramps to the axial edges of each rectangular bearing surface has an angular extent of 10°.

15. A piston according to claim 1, and including a ring band extending around the crown, the ring band being formed with at least one bearing surface spaced radially outwardly thereof.

16. A piston according to claim 1, wherein the piston has a nominal diameter D and wherein the total bearing surface area to one side of a plane including the gudgeon pin axis and the piston axis is between 0.05 and 0.95 $\pi D^2/9$.

17. A piston according to claim 1, wherein all the bearing surfaces to one side of the plane including the piston axis and the gudgeon pin bore axis extend no more than 30° to either side of a plane including the piston axis and normal to the gudgeon pin axis.

18. A piston according to claim 1, wherein the lines of intersection of the surface of each said bearing surface and planes including the piston axis are straight.

19. A piston according to claim 1, wherein the lines of intersection between the surface of each said bearing surface and planes including the piston axis are curved.

20. A piston for reciprocation in a cylinder of an internal combustion engine wherein lubrication with an associated cylinder is provided by an oil film, comprising a crown, a gudgeon pin bore, a ring belt, a first generally cylindrical skirt portion to one side of a plane including the piston axis and the gudgeon pin bore axis, a second generally cylindrical skirt portion to the other side of said plane, said skirt portions being attached to said ring belt, at least three discrete bearing surfaces formed on each of the first and second skirt portions, each of said at least three bearing surfaces having an associated skirt portion therearound and being spaced radially outwardly of the associated skirt portion by a distance of less than 125 microns, shallow hydrodynamic ramps extending from the associated skirt portion to each bearing surface, two of said at least three bearing surfaces and associated ramps forming a row and being aligned and being spaced or opposite sides of a plane including the piston axis and normal to the gudgeon pin bore axis, the at least one remaining bearing surface and associated ramps being spaced axially from said two of said at least three bearing surfaces and associated ramps, the at least three bearing surfaces on each skirt portion transmitting lateral thrust from the piston to the co-operating cylinder with the surrounding skirt portions providing retained oil said distance from said bearing surfaces and said shallow hydrodynamic ramps co-operating with the cylinder to force a thin oil film over the bearing surfaces during motion of the piston relative to the cylinder to hydrodynamically lubricate said at least three bearing surfaces.

21. A piston for reciprocation in a cylinder of an internal combustion engine wherein lubrication withan associated cylinder is provided by an oil film, comprising a crown, a gudgeon pin bore, a ring belt, a first generally cylindrical skirt portion to one side of a plane including the piston axis and the gudgeon pin bore axis, a second generally cylindrical skirt portion to the other side of said plane, said skirt portions being attached to said ring belt, a small number of discrete bearing surfaces formed on the first and second skirt portions, each said bearing surface having generally circumferentially extending front and rear edges and generally axially extending side edges extending between said front and rear edges, shallow hydrodynamic ramps connecting each said front and rear generally circumferential edge to the surrounding skirt portion, each said discrete bearing surface being surrounded by an associated one of said skirt portions and being spaced radially outwardly of said associated skirt portion by less than 125 microns, the surrounding skirt portions providing retained oil closely adjacent the bearing surfaces and said ramps co-operating with the cylinder to force a thin oil film over the bearing surfaces during motion of the piston relative to the cylinder to hydrodynamically lubricate said bearing surfaces as the bearing surfaces transmit lateral thrust from the piston to the co-operating cylinder.

22. A piston according to claim 21 wherein each said shallow hydrodynamic ramp has an angle of less than 1.5°.

23. A piston for reciprocation in a cylinder of an internal combustion engine wherein lubrication with an associated cylinder is provided by an oil film, comprising a crown, a gudgeon pin bore, a ring belt, a first generally cylindrical skirt portion to one side of a plane including the piston axis and the gudgeon pin bore axis, a second generally cylindrical skirt portion to the other side of said plane, said skirt portions being attached to said ring belt, a small number of discrete bearing surfaces formed on the first and second skirt portions, each said discrete bearing surface being surrounded by an associated one of said skirt portions and being spaced radially outwardly of the associated one of said skirt portions by a small distance, a circumferentially extending front edge to each bearing surface, a circumferentially extending rear edge to each bearing surface, generally axially extending side edges interconnecting the front and rear edges of each bearing surface, a shallow hydrodynamic ramp having an angle of less that 1.5° and connecting each said circumferential front edge to the surrounding skirt portion, a shallow hydrodynamic ramp having an angle of less than 1.5° and connecting each said circumferential rear edge to the surrounding skirt portion, said ramps co-operating with the cylinder to force a thin oil film over the bearing surfaces during motion of the piston relative to the cylinder to hydrodynamically lubricate said bearing surfaces as the bearing surfaces transmit lateral thrust from the piston to the co-operating cylinder and the surrounding skirt portions providing retained oil said small distance from said bearing surfaces.

24. A piston according to claim 23 wherein each bearing surface is spaced from the surrounding skirt portion by less than 125 microns.

25. A piston for reciprocation in a cylinder of an internal combustion engine wherein lubrication with an associated cylinder is provided by an oil film, comprising a crown, a gudgeon pin bore, a ring belt, a first generally cylindrical skirt portion to one side of a plane including the piston axis and the gudgeon pin bore axis, a second generally cylindrical skirt portion to the other side of said plane,
said skirt portions being attached to said ring belt,
at least three discrete bearing surfaces formed on each of the first and secnd skirt portions,
each of said at least three bearing surfaces having an associated skirt portion therearound and being spaced radially outwardly of the associated skirt portion by a small distance,
hydrodynamic ramps having an angle of less than 1.5° extending from the associated skirt portion to each bearing surface,
two of said at least three bearing surfaces and associated ramps forming a row and being aligned and being spaced on opposite sides of a plane including the piston axis and normal to the gudgeon pin bore axis,
the at least one remaining bearing surface and associated ramps being space axially from said two of said at least three bearing surfaces and associated ramps, the at least three bearing surfaces on each skirt portion transmitting lateral thrust from the piston to the co-operating cylinder with the surrounding skirt portions providing retained oil said small distance from said bearing surfaces and said hydrodynamic ramps co-operating with the cylinder to force a thin oil film over the bearing surfaces during motion of the piston relative to the cylinder to hydrodynamically lubricate said at least three bearing surfaces.

26. A piston for reciprocation in a cylinder of an internal combustion engine wherein lubrication with an associated cylinder is provided by an oil film, comprising
a crown,
a gudgeon pin bore,
a ring belt,
a first generally cylindrical skirt portion to one side of a plane including the piston axis and the gudgeon pin bore axis,
a second generally cylindrical skirt portion to the other side of said plane,
said skirt portions being attached to said ring belt,
at least three discrete bearing surfaces formed on each of the first and second skirt portions,
each of said at least three bearing surfaces having an associated skirt portion therearound and being spaced radially outwardly of the associated skirt portion by a small distance,
shallow hydrodynamic rmps extending from the associated skirt portion to each bearing surface, the ends of said ramps remote from the associated bearing surfaces being spaced from the associated surface in a radial direction by less than 125 microns,
two of said at least three bearing surfaces and associated ramps forming a row and being aligned and being spaced on opposite sides of a plane including the piston axis and normal to the gudgeon pin bore axis,
the at least one remaining bearing surface and associated ramps being spaced axially from said two of said at least three bearing surfaces and associated ramps, the at least three bearing surfaces on each skirt portion transmitting lateral thrust from the piston to the co-operating cylinder with the surrounding skirt portions providing retained oil said small distance from said bearing surfaces and shallow hydrodynamic ramps co-operating with the cylinder to force a thin oil film over the bearing surfaces during motion of the piston relative to the cylinder to hydrodynamically lubricate said at least three bearing surfaces.

27. A piston according to claim 20 or 26 wherein the angles of the ramps relative to a notional cylindrical surface coaxial with the piston axis are less than 1.5 degrees.

28. A piston according to claims 20, 21 or 23 wherein said skirt portions are spaced radially inwardly of the said at least one bearing surface by less than 125 microns and more than 25 microns.

29. A piston according to claim 20, 21, 23, 36 or 37 wherein said bearing surfaces are generally rectangular in shape.

30. A piston according to claim 29 wherein the relation of the axial extents of said rectangular bearing surfaces to the circumferential lengths of said bearing surfaces is such as to ensure that at least some of the lubricant leaves said bearing surface over the edge thereof which is the trailing edge during reciprocation of the piston in one direction.

31. A piston according to claim 30 wherein the lengths of the bearing surfaces in an axial direction are less than the widths of the surfaces in a circumferential direction.

32. A piston according to claim 20, 21 or 23 wherein there are at least three bearing surfaces for transmitting lateral thrust during reciprocation of the piston in one direction, two of said bearing surfaces being towards said crown of the piston and the remaining surface or surfaces being towards the lower end of the piston.

33. A piston according to claim 32 wherein the two crown end bearing surfaces have a greater surface area than the remaining bearing surface or bearing surfaces.

34. A piston according to claim 32 wherein the crown end bearing surfaces are equidistantly spaced on either side of said plane including the piston axis and normal to the gudgeon pin bore axis and wherein the remaining bearing surface, or one of the remaining bearing surfaces, is symmetrically disposed about said plane.

35. A piston according to claim 34 wherein the spacing between the crown end bearing surfaces is at least as great as the circumferential length of the remaining bearing surface, or that one of the remaining surfaces, which is symmetrically disposed about said plane.

36. A piston according to claim 29 wherein each rectangular bearing surface has a ramp extending up to each axially extending edge thereof.

37. A piston according to claim 36 wherein each of said ramps to the axial edges of each rectangular bearing surface has an angular extent of 10°.

38. A piston according to claim 29 wherein said ring belt extends around the crown and said ring belt being formed with one or more bearing surfaces spaced radially outwardly thereof.

39. A piston according to claim 20, 21, 23, 25 or 26 wherein the piston has a nominal diameter D and wherein the total baring surface area to one side of said plane including the gudgeon pin axis and the piston axis is between 0.05 and 0.95 $\pi D^2/9$.

40. A piston according to claim 20, 21, 23, 25 or 26 wherein the bearing surfaces to one side of said plane including the piston axis and the gudgeon pin bore axis extends no more than 30° to either side of said plane.

41. A piston according to claim 20, 21, 23, 25 or 26 wherein the lines of intersection of the surfaces of said bearing surfaces and planes including the piston axis are straight.

42. A piston according to claim 20, 21, 23, 25, or 26 wherein the lines of intersection between the surfaces of said bearing surfaces and planes including the piston axis are curved.

43. A piston according to claim 25 wherein bearing surfaces are equidistantly spaced on either side of said plane including the piston axis and normal to the gudgeon pin bore axis and wherein the remaining bearing surface, or one of the remaining bearing surfaces, is symmetrically disposed about said plane.

44. A piston according to claim 43 wherein the spacing between said two bearing surfaces is at least as great as the circumferential length of said at least one remaining bearing surface which is symmetrically disposed about said plane.

45. A piston according to claim 26 wherein said two bearing surfaces have a greater surface area than the remaining bearing surface or bearing surfaces.

46. A piston according to claim 26 wherein said two bearing surfaces are equidistantly spaced on either side of said plane including the piston axis and normal to the gudgeon pin bore axis and wherein the remaining bearing surface, or one of the remaining bearing surfaces, is symmetrically disposed about said plane.

47. A piston according to claim 46 wherein the spacing between said two bearing surfaces is at least as great as the circumferential length of the remaining bearing surface, or that one of the remaining surfaces, which is symmetrically disposed about said plane.

* * * * *